K. I. CROSSLEY AND W. LE P. WEBB.
INTERNAL COMBUSTION ENGINE.
APPLICATION FILED JULY 27, 1920.
1,423,085.
Patented July 18, 1922.
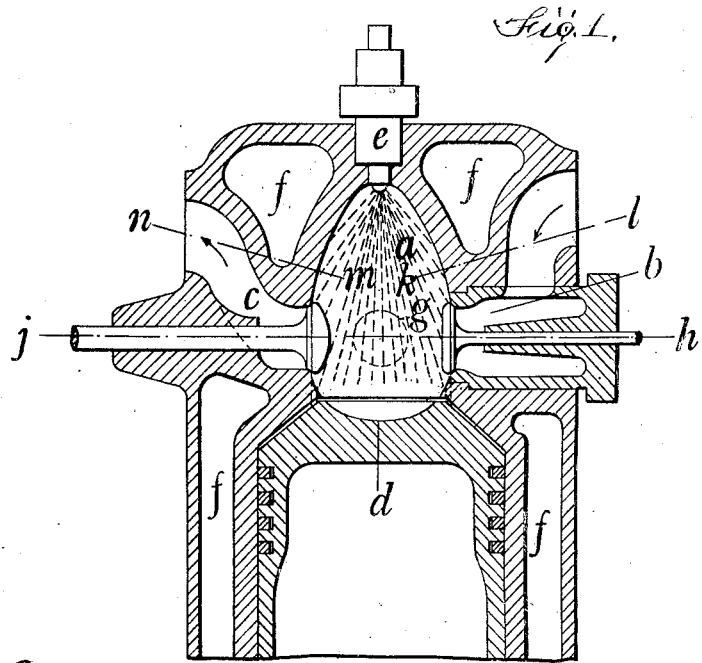
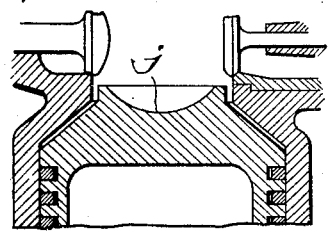
Inventors
K. I. Crossley
W. L. P. Webb
By H. R. Kerslake,
Attorney

UNITED STATES PATENT OFFICE.

KENNETH IRWIN CROSSLEY AND WILFRED LE PLASTRIER WEBB, OF MANCHESTER, ENGLAND.

INTERNAL-COMBUSTION ENGINE.

1,423,085.  Specification of Letters Patent.  Patented July 18, 1922.

Application filed July 27, 1920. Serial No. 399,391.

(GRANTED UNDER THE PROVISIONS OF THE ACT OF MARCH 3, 1921, 41 STAT. L., 1313.)

*To all whom it may concern:*

Be it known that we, KENNETH IRWIN CROSSLEY and WILFRED LE PLASTRIER WEBB, subjects of the King of Great Britain and Ireland, and residents of Openshaw, Manchester, in the county of Lancaster, England, have invented certain new and useful Improvements Relating to Internal-Combustion Engines (for which we have filed an application in Great Britain dated February 24th, 1915, Patent No. 2,974), of which the following is a specification.

Our invention relates to improvements in combustion chambers of internal combustion oil engines working on the four stroke cycle and has for its object the improvement of the mixing of the oil fuel with the air, the improvement of the combustion and the improvement of the thermal efficiency of the engine.

The kind of engine to which our invention relates is that in which the fuel is injected without the aid of separate injection air into the compressed and therefore heated air in the combustion chamber at or near the end of the compression stroke.

We arrange the combustion chamber with the air admission valve and exhaust valve on two of its sides and in some cases we arrange an air starter valve on a third side of the combustion chamber.

The combustion chamber is constructed in such a manner as to be approximately oviform in shape or as near thereto as the limitations of design will permit, the oil injector nozzle being located in the smaller end and the end of the piston forming the larger end.

By constructing the combustion chamber in this manner the oil spray issuing from the oil injector thoroughly permeates the hot compressed air in the combustion chamber and is vaporized before reaching the walls, the combustion is improved by the efficiency of this mixing and vaporizing process and the thermal efficiency of the engine is thereby improved.

If desired the end of the piston may be reduced in size and arranged to enter the end of the combustion chamber at the end of the compression and exhaust strokes.

If the heat due to the compression of the air is not sufficient to effect ignition, an ignition device such as an ignition tube or bulb, or an electric sparking plug or some catalytic means, may be provided at one side of the combustion chamber.

If the heat of compression is sufficient for ignition no separate ignition device is necessary unless specially desired as an alternative.

On the accompanying drawing, Figure 1, is a sectional elevation of a portion of an engine having our invention applied thereto and Figure 2 a similar view of a portion sufficient to show a modification in the form of the piston.

Referring to the drawing a combustion chamber of an engine constructed according to one means of applying our invention is shown at A, with an air admission valve at B, an exhaust valve at C, the end of the piston at D, an oil injector sprayer at E, and water jacket at F F F F. An ignition device if one is used is indicated at G.

Instead of the air admission valve and exhaust valve being placed as shown and opposite to each other on the lines H J they may be placed at any other convenient positions on any two sides of the combustion chamber, such for example as in the positions indicated by the dotted centre lines K L and M N.

If desired the end of the piston may be reduced in size and arranged to enter the larger end of the combustion chamber at the end of the compression and exhaust strokes. Such a reduction in size of the end of the piston is indicated as an example by Figure 2 the end of the piston then entering the combustion chamber which is suitably arranged for the purpose as shown by said Figure 2.

Having now described our invention what we claim is:—

1. In internal combustion engines, the combination comprising an oviform combustion chamber, an oil injector sprayer at the smaller end of said chamber, a piston forming the larger end of the chamber and air admission and exhaust valves at respective sides of the chamber, as set forth.

2. In internal combustion engines, the combination comprising an oviform combustion chamber, an oil injector sprayer at the smaller end of said chamber, a piston forming the larger end of and entering the chamber and air admission and exhaust valves at respective sides of the chamber, as set forth.

3. In internal combustion engines, the combination comprising an oviform combustion chamber, an oil injector sprayer at the smaller end of said chamber, a piston forming the larger end of the chamber and air admission and exhaust valves and an igniter at respective sides of the chamber, as set forth.

In testimony whereof we have signed our names to this specification.

KENNETH IRWIN CROSSLEY.
   WILFRED LE PLASTRIER WEBB.